(No Model.) 10 Sheets—Sheet 1.
P. BARON.
MACHINE FOR MAKING SCREWS.

No. 467,787. Patented Jan. 26, 1892.

FIG.1.

(No Model.) 10 Sheets—Sheet 3.

P. BARON.
MACHINE FOR MAKING SCREWS.

No. 467,787. Patented Jan. 26, 1892.

FIG.3.

(No Model.) 10 Sheets—Sheet 4.
P. BARON.
MACHINE FOR MAKING SCREWS.

No. 467,787. Patented Jan. 26, 1892.

Witnesses:
J. A. Rutherford.
J. H. Daly.

Inventor:
Peter Baron
By James L. Norris.
Attorney.

(No Model.) 10 Sheets—Sheet 6.

P. BARON.
MACHINE FOR MAKING SCREWS

No. 467,787. Patented Jan. 26, 1892.

(No Model.) 10 Sheets—Sheet 8.
P. BARON.
MACHINE FOR MAKING SCREWS.

No. 467,787. Patented Jan. 26, 1892.

FIG. 8.

(No Model.) 10 Sheets—Sheet 9.
P. BARON.
MACHINE FOR MAKING SCREWS.

No. 467,787. Patented Jan. 26, 1892.

UNITED STATES PATENT OFFICE.

PETER BARON, OF LONDON, ENGLAND, ASSIGNOR TO HERBERT HENRY GRENFELL, OF SAME PLACE.

MACHINE FOR MAKING SCREWS.

SPECIFICATION forming part of Letters Patent No. 467,787, dated January 26, 1892.

Application filed March 31, 1891. Serial No. 387,175. (No model.)

*To all whom it may concern:*

Be it known that I, PETER BARON, engineer, a subject of the Queen of Great Britain, and a resident of London, England, have invented certain new and useful Improvements in Machinery or Apparatus for the Manufacture of Screws and for other Articles, of which the following is a specification, reference being had to the accompanying drawings.

My invention relates to machines or apparatus chiefly designed for the manufacture of screws.

An important feature of my said invention consists in mounting the tool-holders in a suitable carrier which is adjustable about an axis parallel to the bed of the machine. For this purpose I provide in the said carrier spindles or mandrels arranged horizontally or parallel to the axis of the said carrier and provided with sockets to receive the tools. These spindles, mandrels, or tool-holders are arranged in a circular series—that is to say, at equal distances from the axis of the said carrier—so that by turning the latter about its axis the tools can be consecutively brought into their operative position.

Another feature of my said invention is the provision of means for locking the said carrier so that either of the tool-holders may be firmly secured in its operative position.

My said invention comprises, moreover, improved means for chucking or centering the rod, wire, or blank and for holding and rotating the same while the screws or other articles are being formed therefrom.

My said invention also comprises improved means whereby I provide for regulating the length of the portion of the rod or wire subjected to the action of the tools; and my said invention further comprises other improvements hereinafter set forth.

In the accompanying drawings I have shown how my said invention may be conveniently and advantageously carried into practice.

Fig. 3 is an end elevation.

Like letters indicate corresponding parts throughout the drawings.

A is the bed of the machine, which is substantially similar to that of an ordinary lathe.

B is a head firmly secured to the bed A at one extremity thereof.

C is a hollow mandrel fitted to rotate in suitable bearings $B'$ in the head B.

D is a speed-cone formed or fixed upon the mandrel C.

E is the driving belt or band.

F is the wire, rod, or blank from which it is intended to manufacture the screws.

$a$ is a movable head or saddle fitted to slide freely to and fro upon V-shaped or other suitable ways provided on the bed A.

$b$ is a rack firmly secured to or formed on the bed A.

$c$ is a pinion, which is mounted upon a spindle $c'$, supported in suitable bearings in an extension or bracket $a'$, firmly secured to or formed on the saddle $a$, and is geared with the rack $p$.

$d$ is a hand-wheel, which is secured upon the outer extremity of the spindle $c'$, and whereby the latter can be rotated so as to impart a to-and-fro movement to the saddle along the bed A.

$e\ e'\ e^2$ are mandrels or tool-holders supported in suitable bearings in disks or conical pieces $f$, mounted in correspondingly-shaped holes $a^2$ in extensions $a^3$ of a block or head $a^*$, which is supported upon suitable ways on the movable head or saddle $a$, and is secured thereto by bolts and nuts, set-screws, or in any other convenient manner so as to be capable of longitudinal adjustment relatively thereto. The disks or conical pieces $f$ are fitted to turn freely in the said extensions $a^3$, and are secured or coupled together by means of a bolt, stay, or distance-piece $f'$, thus forming what I term the "carrier."

The mandrels or tool-holders $e\ e'$ are hollow or tubular and are provided at their forward ends with hollow collars or sockets $e^3$, in which are firmly secured by means of set-screws $e^{3*}$ or in any other convenient manner, so as to be readily removable therefrom, cutter-heads $g\ g'$, for the purpose hereinafter described. $e^4\ e^4$ are collars adjustably secured by means of set-screws or in any other convenient manner upon the other or outer ends of the said mandrels $e\ e'$.

$f^2\ f^2$ are V-shaped or other suitable feathers secured to or formed on one of the disks or conical pieces $f$, and fitting into suitable keyways or grooves $e^*$ in the mandrels $e\ e'$, so as to admit of their moving freely to and fro in the said disks or conical pieces $f$, but to prevent any rotary movement thereof. The mandrel or tool-holder $e^2$ is so arranged that it is free to move to and fro in the disks or conical pieces $f$ and also to rotate therein, and is provided at its forward end with a collar or enlargement $e^5$, having a suitable recess in which is secured, by means of a set-screw $e^6$ or otherwise, so as to be readily removable therefrom, a die $h$ for cutting a screw-thread of the required pitch. $e^7$ is a milled head or knob mounted upon the rear end of the said mandrel $e^2$, so as to be capable of rotating freely thereon.

The mandrels or tool-holders $e\ e'\ e^2$ and disks or conical pieces $f$ are so arranged that when the latter are turned or rotated so as to bring one or other of the said mandrels into the highest position the axis of the said mandrel will be coincident with the axis of the hollow mandrel C. The rod or wire F to be operated upon is passed through the hollow mandrel C and through a bush $i$, fitting easily upon the said rod or wire and arranged in a hole $a^5$, formed in an extension $a^6$ of the saddle $a$. The said bush $i$ is held in position by means of a set-screw $i'$, and when the set-screw is slackened can be easily removed and replaced by another one to correspond with the dimensions of the rod or wire to be operated upon.

$j$ is a chuck secured to or formed on one extremity of the hollow mandrel C. The chuck $j$ is fitted with jaws $j'\ j^2$, which are adjustable in suitable grooves or ways to or from the rod or wire F by means of set-screws $k\ k'$. The set-screw $k$ is provided with a square head adapted to receive a wrench, and is adapted to move the jaw $j'$. The set-screw $k'$ is provided with a nick or slit for a screw-driver and is adapted to move the jaw $j^2$. In centering or chucking the rod or wire one of the said jaws, preferably the jaw $j^2$, is first adjusted, so as to set the rod, wire, or blank F perfectly true, and the jaw $j'$ is then screwed up, so as to grip, clamp, or secure the said rod or wire F firmly in position between the said jaws. Then by slackening the set-screw $k$ at any time the wire or rod F can be released and moved forward through the chuck $j$. I am thus enabled to insure the operator always slackening the same jaw when moving forward the rod, wire, or blank, and thus prevent the latter from getting out of truth when the said operation is frequently repeated.

Figure 10:
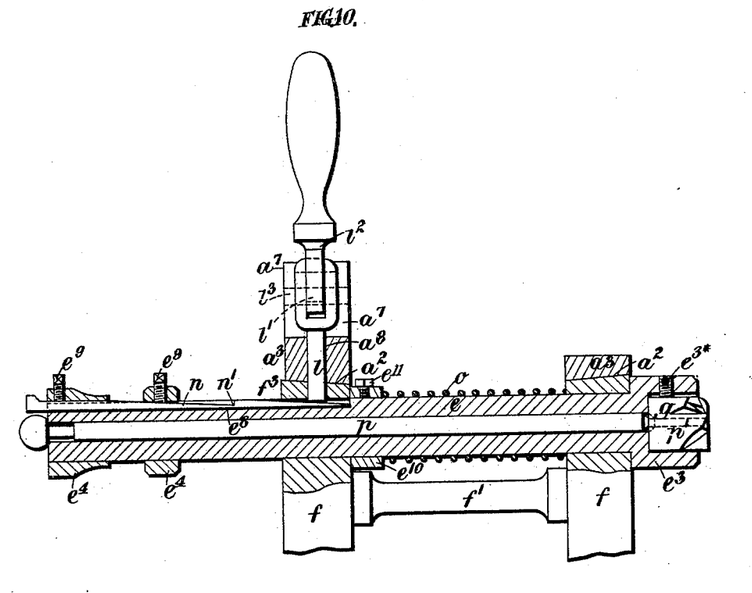
Fig. 10 is a vertical central section, partly in elevation, drawn to the same scale as Figs. 5, 6, 7, and 8.

$l$ is a catch or detent coupled at $l'$ by means of an anti-friction roller working in a suitable recess or slot or otherwise to one arm of a bent or bell-crank lever $l^2$, pivoted at $l^3$ to lugs $a^7$, formed on or secured to one of the extensions $a^3$. The catch $l$ works in a hole $a^8$, formed in the said extension $a^3$, and engages, as more clearly shown in Fig. 10, in one or other of a series of holes $f^3$, formed in the corresponding disks or conical piece $f$ in such a position relatively to each of the mandrels or tool-holders $e\ e'\ e^2$ that when the said catch is engaged in either of the said holes the conical pieces $f$ will be locked firmly in position and the axis of the uppermost of the said mandrels will coincide with the axis of the hollow mandrel C.

Figure 12:
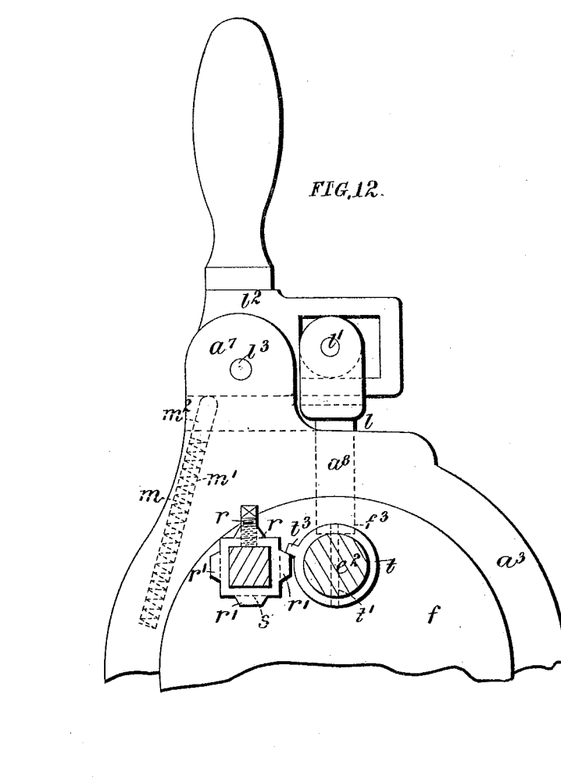
Fig. 12 is an end elevation, partly in vertical section, drawn to the same scale as Fig. 11, and some of the parts being removed, showing details of construction.

$m$ is a spiral spring, which is arranged in a hole or recess $m'$ in the extension $a^3$, as shown in Fig. 12, and which acts through a rod or plunger $m^2$ upon the lever $l^2$, so as to retain the catch $l$ engaged in one or other of the holes $f^3$. I provide, moreover, suitable means for locking or retaining the mandrels or tool-holders $e\ e'$ in their forward or operative positions and for regulating or determining the length of the finished screw to be formed on the rod or wire F—that is to say, I form in each of the said mandrels a keyway or groove $e^8$, Fig. 10, and I fit therein a suitable strip or key $n$, having a notch $n'$ formed in its upper surface. Set-screws $e^9$ are provided in the collars $e^4$ for securing the strips or keys $n$ in position, while permitting the longitudinal adjustment thereof in the grooves $e^8$ when desired. When the mandrel $e$ or $e'$ is moved forward or into its operative position, the stop $l$ drops into the notch $n'$ and locks or secures the said mandrel in position. The forward or operative positions of the mandrels $e\ e'$ can be regulated by adjusting the keys or strips $n$, as above mentioned, in the keyways or grooves $e^8$.

$o\ o$ are spiral springs surrounding the mandrels $e\ e'$. One extremity of each of the said springs $o$ bears against one of the conical pieces $f$ and the other extremity thereof bears against a collar $e^{10}$, firmly secured to the mandrel by means of a set-screw $e^{11}$ or in any other convenient manner.

$p\ p$ are rods arranged within the mandrels or tool-holders $e\ e'$ and having reduced portions $p'$ adapted to fit into the holes in the cutter-heads $g\ g$. The said rods $p$ are adjustably secured in the said mandrels or tool-holders by means of set-screws $e^{12}$ or otherwise. By adjusting the said rods $p$ the length of cut to be made upon the rod or wire F by the said cutter-heads $g\ g'$ can be regulated.

I provide suitable means for preventing rotation of the mandrel $e^2$, carrying the screw-cutting die $h$, during the time requisite to admit of a screw-thread of the desired length being cut upon the rod or wire F and to permit the length of the said screw-thread to be varied at will. For this purpose I employ the device shown more clearly in Figs. 6, 7, 8, 9, and 12—that is to say:

$q$ is a rod or bar firmly secured to the rearmost disk or conical piece $f$ and of a square or other suitable form in transverse section.

$r$ is a sleeve or collar fitted to move freely to and fro upon the rod or bar $q$, but prevented from rotation thereon by reason of the section thereof or by any other convenient means.

$s\ s'$ are collars secured upon the said rod or bar by means of set-screws $s^2$ or otherwise, so that they can be adjusted at will.

$s^3$ is a rod or plunger (more clearly shown in Fig. 9) fitted in a suitable hole or recess $s^4$, formed in an enlargement of the collar $s'$ and acted upon by a spiral spring $s^5$.

The sleeve or collar $r$ is arranged upon the rod or bar $q$ between the collars $s\ s'$ and is retained against the collar $s$ by the spring-rod $s^3$. Ribs or feathers $r'$ are formed on the sleeve or collar $r$, each of which is beveled or cut away at one extremity, as indicated at $r^2$. A collar $t$ is, moreover, secured upon the mandrel $e^2$ in such a manner that it is adjustable thereon by means of a pin $t'$, adapted to fit into a hole $t^2$, formed in the said collar, and to engage in one or other of a series of holes $e^{13}$, provided on the said mandrel $e^2$. A projection $t^3$, formed on or firmly secured to the collar $t$, is adapted to engage with one or other of the ribs or feathers $r'$, and the mandrel $e^2$ during its forward movement is thereby prevented from rotating in the carrier $f$. When, however, the said projection $t^3$ (in the forward movement of the mandrel $e^2$ while cutting or forming the screw-threads upon the rod or wire F) attains the position shown in Fig. 7, it acts upon the inclined, beveled, or cut-away portion $r^2$ of the rib or feather $r'$ so as to press or force back the sleeve or collar $r$ against the spring $s^5$ and permit the rotation of the mandrel or tool-holder $e^2$, the spring $s^5$ yielding or being compressed and reacting at each impact of the projection $t^3$ with the rib or feather $r'$. The cutting action of the screw-cutting die $h$ is thus arrested. The end of the said feather or projection $t^3$ is in some instances also slightly cut away or beveled, in order to facilitate its passage over the cut-away or beveled part $r^2$. When the movement of the hollow mandrel C and consequently that of the rod, wire, or blank F is reversed, the said projection $t^3$ strikes against the under side of the rib or feather $r'$, the end of which is not cut away or beveled, and the rotation of the mandrel or tool-holder $e^2$ is consequently again arrested, so that the said screw-cutting die $h$ is moved backward or unscrewed from the rod or wire F. The mandrel or tool-holder $e^2$ can be manipulated by means of the loose knob or handle $e^7$ to cause the engagement of the screw-cutting die $h$ with the rod, wire, or blank F, or to assist its disengagement therefrom. By adjusting the collars $s\ s'$ and collar or sleeve $r$ upon the rod or bar $q$ or the collar $t$ upon the mandrel $e^3$, or both, the length of the screw-thread cut upon the wire or rod F can be regulated. Should one of the ribs or feathers $r'$ become worn or damaged, the collar or sleeve $r$ can be removed from the rod or bar $q$ and turned so as to bring another of the said ribs or feathers into the operative position.

$u'$ is a slide-rest arranged to be moved transversely to the bed A in suitable ways on the saddle $a$ by means of a screw-threaded spindle $u'$, provided with a handle $u^2$. The slide-rest $u$ is provided at each end with a tool-holder $u^3$ of any suitable description, in one of which is secured a tool $u^4$ for completing the formation of the head of the screw and cutting or severing the latter from the rod F.

Figure 11:
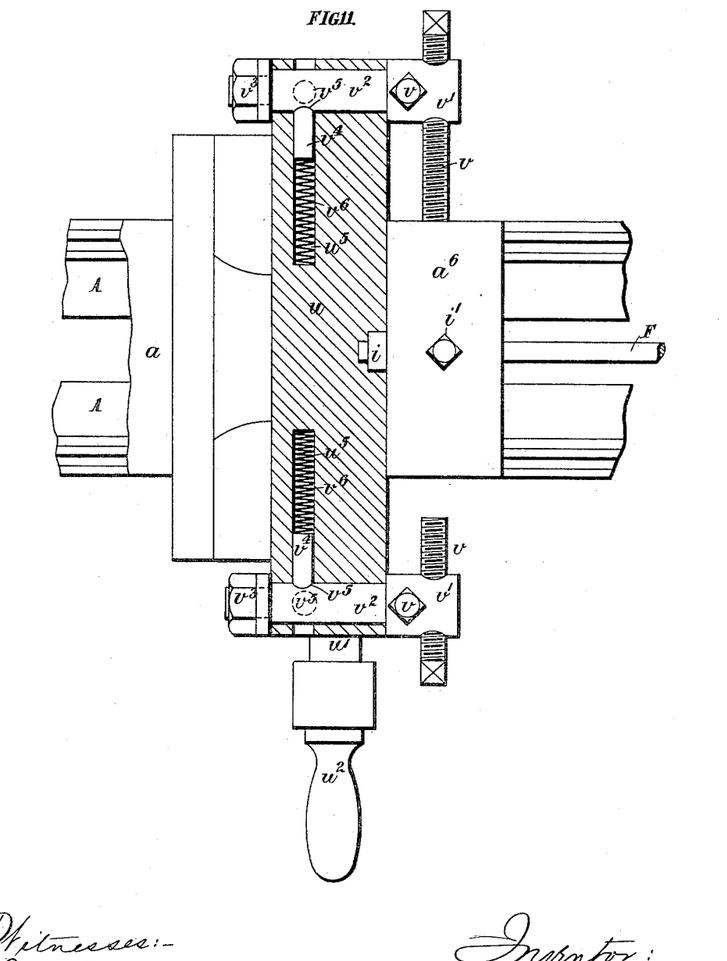
Fig. 11 is a horizontal section on the line $y\ y$, Fig. 2, drawn to a still further enlarged scale.

$v\ v$ are adjustable stops for regulating the movement of the said slide-rest $u$ in both directions. The stops $v$ are arranged in heads or bosses $v'$ on bolts or spindles $v^2$, passed through suitable holes provided in extensions on the slide-rest $u$ and secured therein by nuts $v^3$, as shown more clearly in Fig. 11. In combination with each of the bolts or spindles $v^2$, moreover, is provided a stop or pin $v^4$, arranged, as shown in Fig. 11, in a hole or recess $u^5$ in the slide-rest $u$, and one extremity of which is rounded and engages in one or other of holes or counter-sinks $v^5$ in the said bolt or spindle $v^2$ under the action of a spiral spring $v^6$. The holes or counter-sinks $v^5$ are so arranged that when the rounded end of the stop or pin $v^4$ engages in one or other of the said holes or counter-sinks one of the stops $v$ will be in its operative position and will engage with the movable head or saddle $a$ and arrest the forward movement of the slide-rest $u$ and tool $u^4$. The bolt or spindle $v^2$ is retained in position by the stop or pin $v^4$, but can be turned or adjusted so as to bring one or other of the said stops $v$ into its operative position, the rounded end of the said stop or bolt being forced out of the hole or countersink $v^5$, in which it was engaged, compressing the spring $v^6$ and dropping into or engaging in the next or succeeding hole or counter-sink under the reaction of the said spring.

Figure 1:
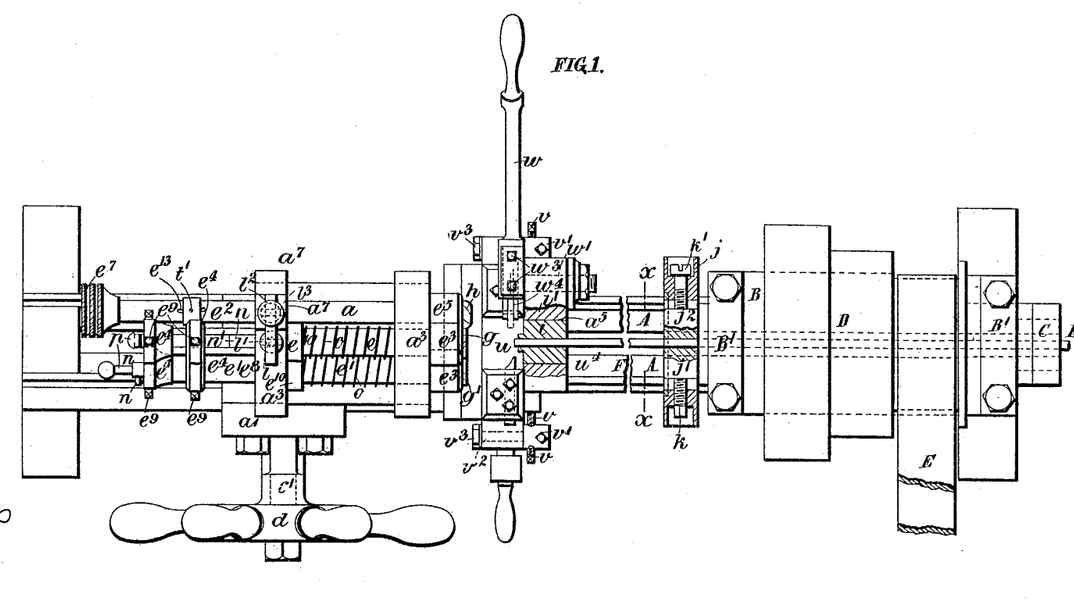
Figure 1 is a plan partly in horizontal section.
Figure 2:
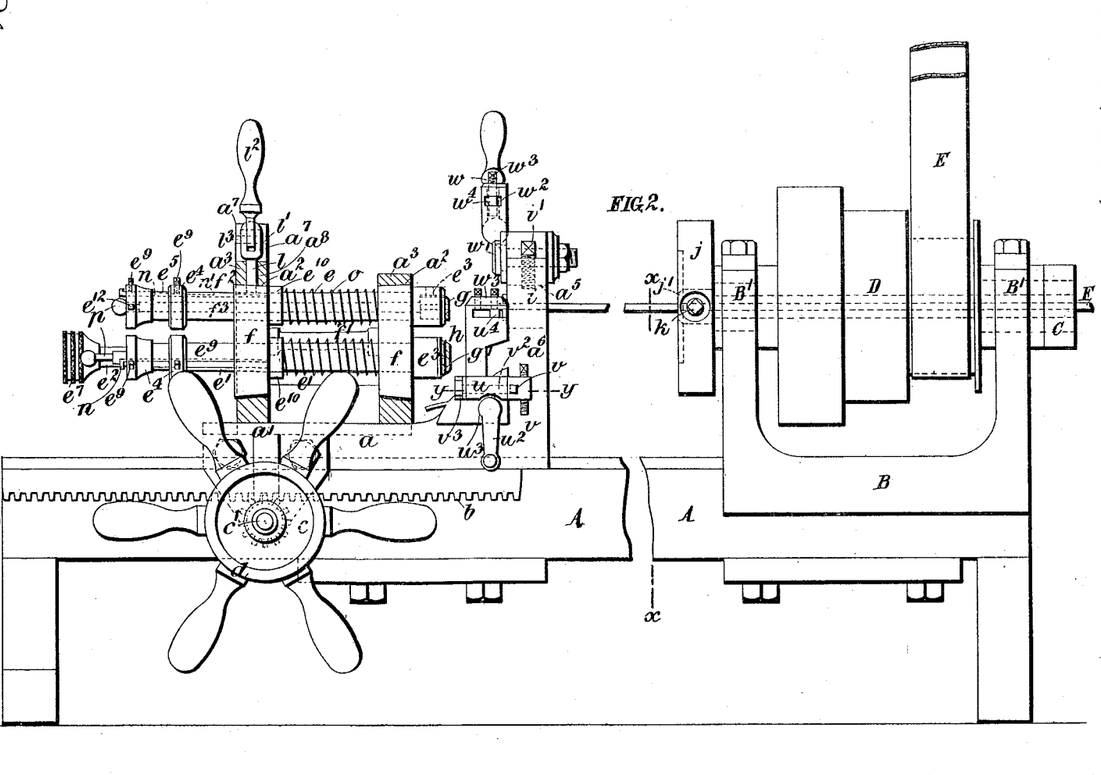
Fig. 2 is a front elevation, partly in vertical section.
Figure 3:
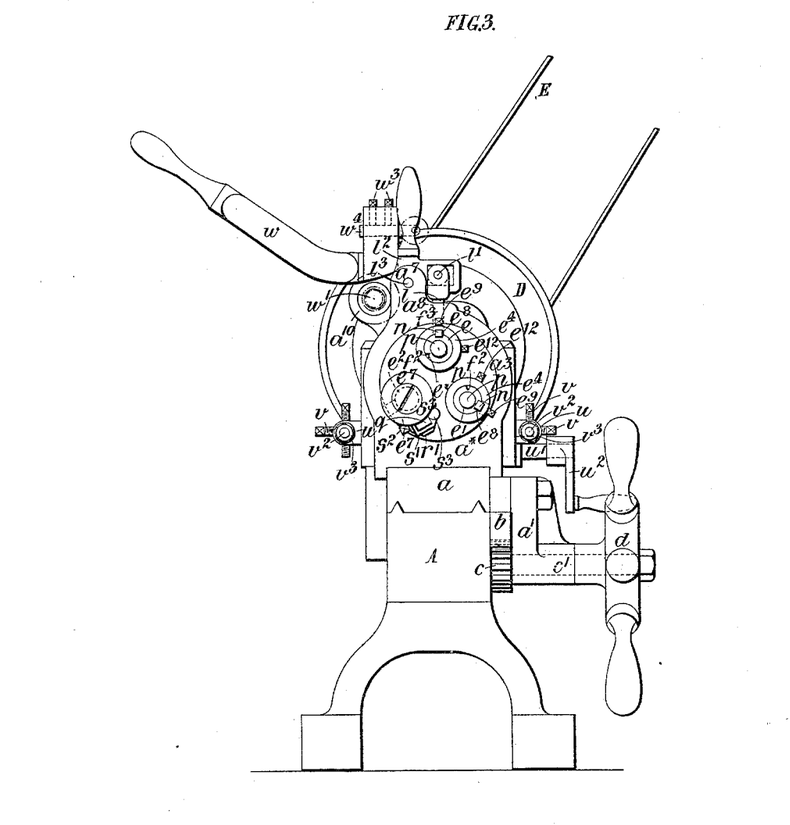
Figure 4:
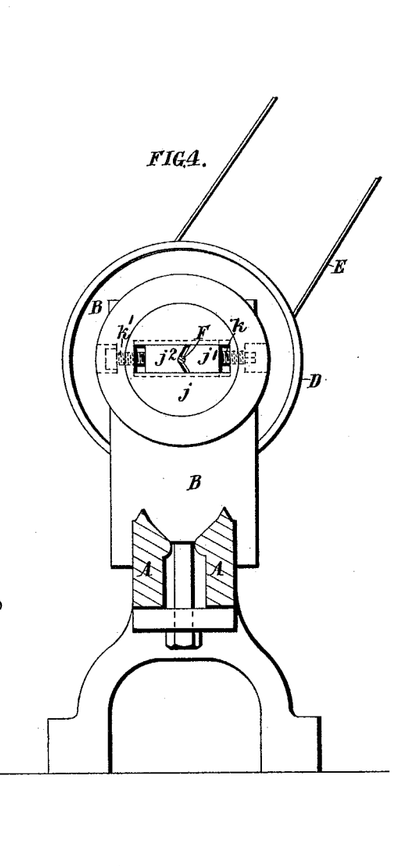
Fig. 4 is a transverse section, on the line $x\ x$, Figs. 1 and 2, showing one form of my improved machine or apparatus for manufacturing screws and other articles.

$w$ is a bent arm or lever, Figs. 1, 2, and 3, pivoted at $w'$ to a lug $a^{11}$, formed on or firmly secured to the extension $a^6$. One arm or the short arm of the lever $w$ is provided with a socket $w^2$, in which is adjustably secured by set-screws $w^3$ or otherwise a rod, bar, or holder $w^4$, upon the lower or one extremity of which is intended to be mounted a suitable milling tool or cutter. The other or long arm of the said lever $w$ forms a handle, by means of which the said milling tool or cutter can be moved into position to operate upon the head of the screw. A suitable counter-shaft, (not shown in the drawings,) connected with the main shafting by a crossed and straight belt, and suitable striking gear or other means for reversing the motion thereof are, moreover, provided.

When the rod or wire is untrue and of varying diameter, or when the diameter thereof is larger than is required to form the head of the screws, I sometimes remove the cutter-head and adjusting-rod from the mandrel or tool-holder $e$ or $e'$ and secure a suitable cutter-head in the hole $a^5$ in the extension $a^6$ in the saddle $a$ in place of the bush $i$. This cutter-head may be either left permanently in position or the movable head or saddle $a$ may be traversed through the entire length of the bed A and the entire length of the rod or wire turned down or reduced, after which a bush corresponding to the reduced diameter of the said rod is secured in the said hole $a^5$ and the rod or wire is replaced in position as before.

Figure 5:
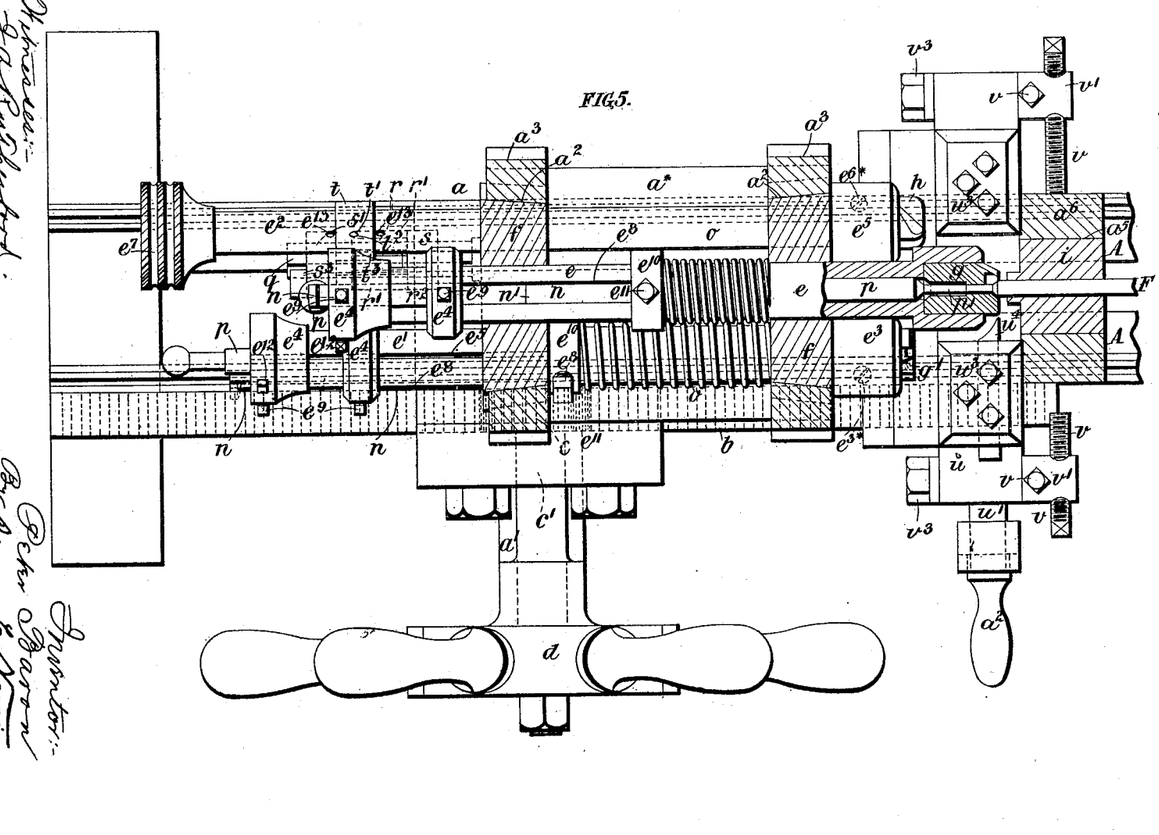
Figs. 5, 6, 7, and 8 are plans, partly in horizontal section, drawn to an enlarged scale, illustrating the different stages in the manufacture of a screw by my improved machine.
Figure 6:
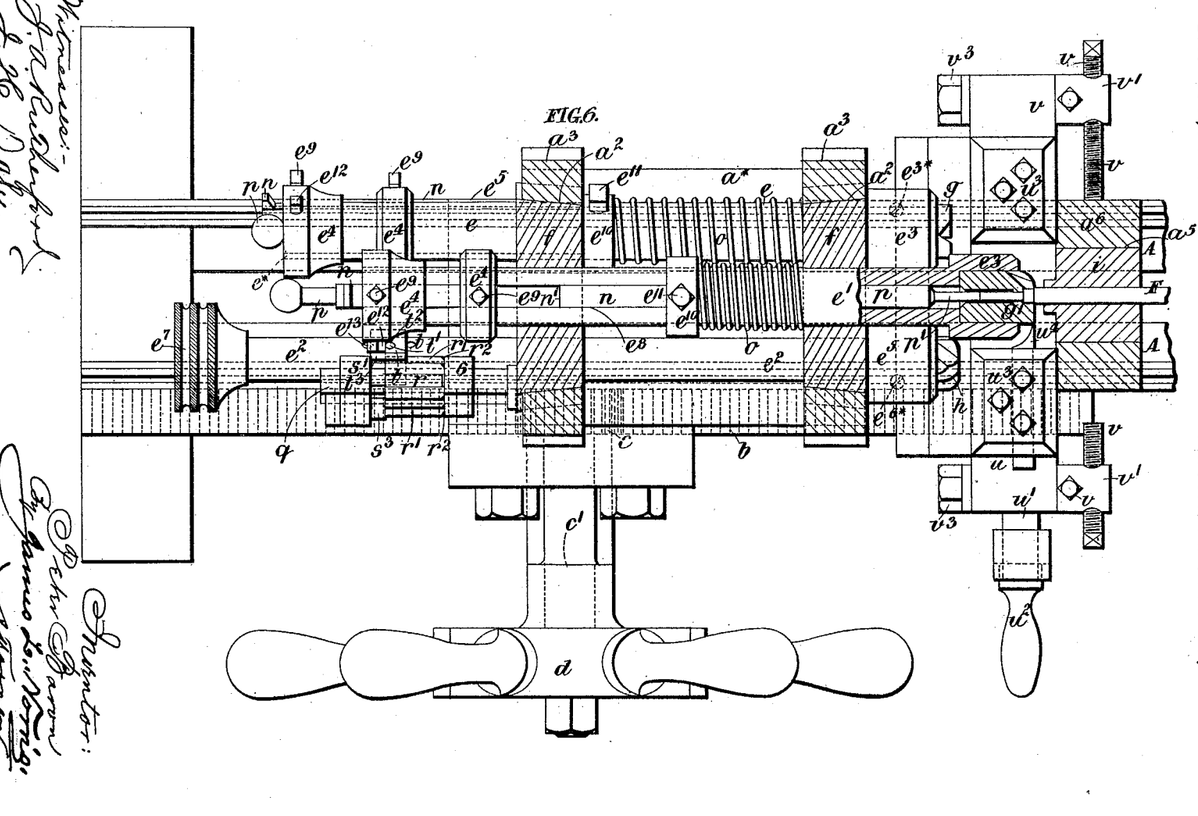
Figure 7:
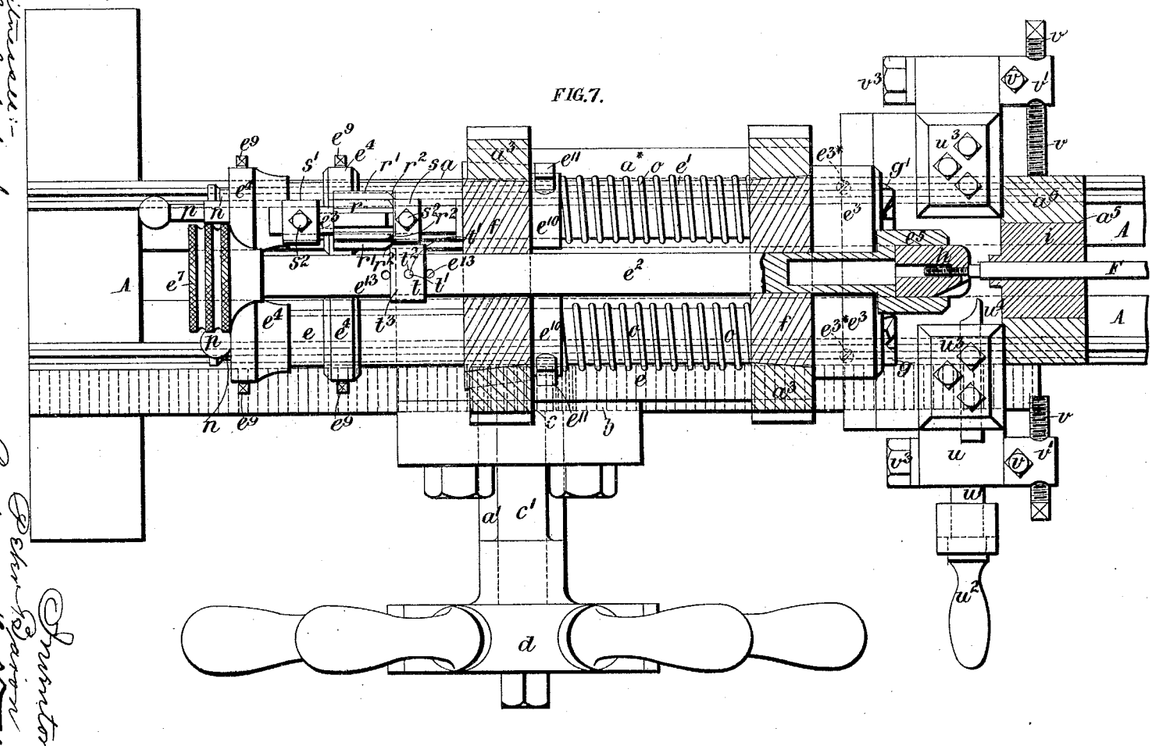
Figure 8:
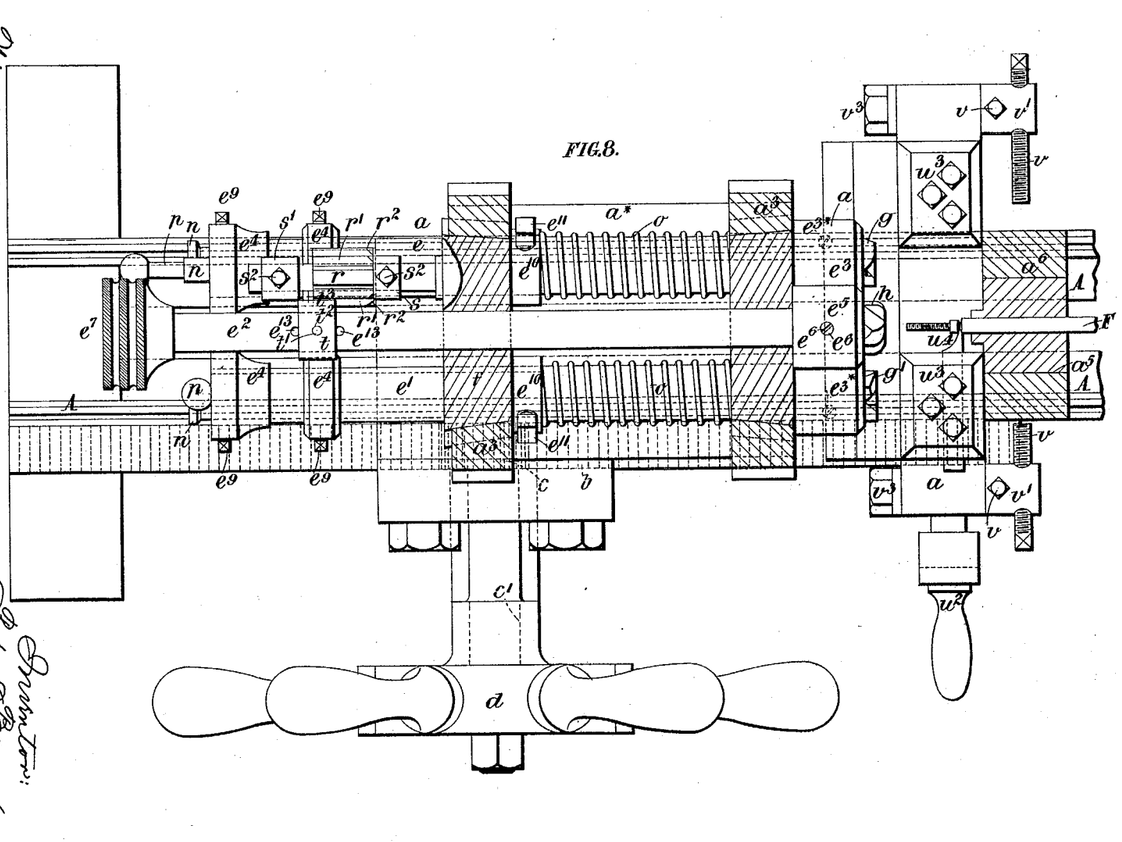
Figure 9:
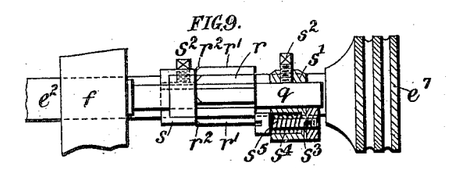
Fig. 9 is a rear elevation, partly in vertical section.

The operation of the apparatus is as follows—that is to say: The mandrel or tool-holder $e$, carrying the cutter $g$ for making the roughing or first cut is brought into line with the wire or rod F by turning the carrier $f$ about its axis, and the latter is then locked in position by the catch, detent, or bolt $l$. The said mandrel or tool-holder $e$ is moved forward and also locked or secured in position by means of the said catch or detent $l$, and the movable head or saddle $a$ is moved forward by means of the hand-wheel $d$, spindle $c'$, pinion $c$, and rack $b$, so that the cutter-head $g$ is forced upon the rod, wire, or blank F, which is firmly held in the chuck $j$ and rapidly rotated with the said chuck and the hollow mandrel C until the end of the rod $p$ comes in contact with the said rod or blank. The end of the said wire or rod F is thus turned down or shaped, as shown in Fig. 5, so as to permit it to enter the cutter head or block $g'$. The catch $l$ is then raised so as to release first the mandrel $e$, which is returned to its normal position under the action of the spring $o$, and then the carrier $f$, which is then turned to bring the mandrel or tool-holder $e'$, carrying the finishing-cutter $g'$, in line with the rod or wire F. The said mandrel or tool-holder $e'$ is then moved forward, the latter and the carrier $f$ are locked in position as before, and the movable head or saddle $a$ is fed or moved forward until the rod $p$ comes into contact with the wire or rod F. The end of the said wire or rod is thus turned or shaped by the cutter-block $g'$ so as to finish the shank and form the head of the screw. In some instances the movable head or saddle $a$ is retreated or moved backward after the first cut has been made by the cutter-block $g$ or the second cut by the cutter-block $g'$, or after both cuts, in order to clear away any turnings or obstructions that may be adhering to the rod or wire F by drawing it through the bush $i$, as shown in Fig. 6. To cut the screw-threads, the catch $l$ is again raised and the mandrel or tool-holder $e'$ and carrier $f$ are released, as before, (the said mandrel being returned to its normal position by its spring $o$,) and the carrier is turned to bring the mandrel or tool-holder $e^2$, carrying the screw-cutting die $h$, opposite the wire or rod F, and is locked in position by the said catch $l$. The said mandrel or tool-holder $e^2$ is then moved or pushed forward by means of the loose knob or handle $e^7$, and is held from rotating by the projection $t^3$ engaging with the feather $r'$, and cuts a screw-thread upon the rod or wire F, as shown in Fig. 7. When, however, the said projection $t^3$ reaches the beveled or cut-away portion $r^2$, the mandrel is released and revolves, and upon the motion of the mandrel C and wire or rod F being reversed is returned to its normal position, as hereinbefore described. To separate or detach the finished screw from the wire rod or blank F, the slide-rest $u$ is operated by meads of the handle $u^3$ and screw-threaded spindle $u'$ to form a cut in the said rod, wire, or blank F, as shown in Fig. 8.

The form of the upper portion or surface of the head of the screw is regulated by the shape of the tool $u^4$. In some instances another tool is also provided in the second tool-holder for this purpose.

In cases where it is desired to mill the head of the screw the bent arm or lever $w$ is moved over so as to bring the milling tool or cutter $w^2$ into operation previous to cutting off the said screw.

To adapt the machine for cutting left-handed screw-threads, the ends of the ribs or feathers $r'$ on the collar or sleeve $r$ are cut away or beveled on their under sides or surfaces instead of on the upper surfaces thereof, and the projection $t^3$ first engages with and travels up the said under surface and returns along the upper surface thereof. Suitable left-handed cutter-heads and screw die or dies are also provided, and the motion of the mandrel C and wire rod or blank F is reversed.

In some instances I arrange one or more of the ribs or feathers $r'$ on the block or piece $r$ for cutting left-handed screw-threads and one or more for cutting right-handed threads, thereby enabling the same block or piece to be employed for both right and left handed screw-threads.

I find it most advantageous to mount the tool-holders in a carrier adjustable about an axis parallel to the bed of the machine, as hereinbefore described. It is obvious, however, that they can be mounted with their axes in the same plane in a carrier arranged to slide or move transversely to the said bed.

Although I have hereinbefore described my improved machine more particularly with reference to the manufacture of screws it will be readily understood that it is also advantageously applicable for the manufacture of other articles—such as, for instance, nuts. In this case the tool-holders are fitted with suitable chucks or jaws (instead of the hereinbefore-described cutter-blocks and screw-cutting die) adapted to receive one or more drills and taps. I may employ any other convenient number of mandrels or tool-holders, and the cutter heads or blocks and screw-cutting dies and drills and taps or other tools may be of any suitable kind in accordance with the form of machine-screw or other article which it is desired to manufacture.

What I claim is—

1. In a machine for the manufacture of screws and other articles, the combination, with a longitudinally-movable saddle, of a carrier constructed to rotate about a horizontal axis in the said saddle and two or more tool-holders longitudinally movable in the said carrier, as set forth.

2. In a machine for the manufacture of screws and other articles, the combination, with the head-stock having a hollow mandrel and a chuck or clamp for holding and rotating the rod or wire, of a longitudinally-movable saddle and a tool-carrier constructed to rotate about a horizontal axis in the said saddle, as set forth.

3. In a machine for the manufacture of screws and other articles, the combination of a longitudinally-movable saddle $a$, a rotatable carrier $f$, constructed to rotate about a horizontal axis in the saddle $a$ and having holes $f^3$ in its periphery, a locking-bolt $l$, mounted in holes $a^8$ in the carrier and adapted to engage with the holes $f^3$, and a lever $l^2$, pivoted to the supports of the carrier and coupled to the locking-bolt, as set forth.

4. In a machine for the manufacture of screws and other articles, the combination of a saddle, a carrier constructed to rotate about a horizontal axis therein, a longitudinally-movable cutter-mandrel or tool-holder mounted in the carrier, a notched feather-key secured in the mandrel, and a locking-bolt adapted to engage with the said notch to maintain the mandrel in operative position, as set forth.

5. In a machine for the manufacture of screws and other articles, the combination of a saddle, a carrier constructed to rotate about a horizontal axis therein, a longitudinally-movable cutter, mandrels or tool-holders mounted in the carrier, a notched feather-key secured in the mandrel, a locking-bolt adapted to engage with the said notch to maintain the mandrel in operative position, and a spiral spring $o$, mounted on the mandrel or tool-holder for returning the same to its inoperative or idle position upon the withdrawal of the said locking-bolt from engagement with the said notched key or feather, as set forth.

6. In a machine for the manufacture of screws and other articles, the combination, with the hollow or tubular adjustable cutter, mandrels, or tool-holders, of an adjustable regulating-rod placed axially within each tool-holder, as set forth.

7. In a machine for the manufacture of screws and other articles, the combination, with the hollow or tubular adjustable cutter, mandrels, or tool-holders, of an adjustable regulating-rod placed axially within each tool-holder and screws for securing the same in any desired position, as set forth.

8. In a machine for the manufacture of screws and other articles, the combination of a longitudinally-movable mandrel holding a screw-cutting tool, a tooth formed on the said mandrel, a non-rotating collar capable of sliding on a shaft secured to the carrier and having ribs or feathers engaging with the said tooth, said ribs being beveled at one end, and a spring for forcing the collar in one direction, as set forth.

9. In a machine for the manufacture of screws and other articles, the combination of a longitudinally-movable mandrel holding a screw-cutting tool, a tooth formed on the said mandrel, a non-rotating collar capable of sliding on a shaft secured to the carrier and having ribs or feathers engaging with the said tooth, said ribs being beveled at one end, an adjustable collar mounted on said shaft and forming an end bearing for the said ribbed collar, a spring carried by another adjustable collar, mounted on said shaft, and a spring operating to force the ribbed collar against the said end bearing, as set forth.

10. In a machine for the manufacture of screws and other articles, the combination of the transversely-moving slide-rest $u$, adjusting screw-bolts $v$, spindles $v^2$, having countersunk depressions or holes $v^5$, and through which the said bolts are screwed, locking-bolts $v^4$, carried by the slide-rest, and springs $v^6$ for forcing the bolts $v^4$ into engagement with the said depressions or holes $v^5$, as set forth.

11. In a machine for the manufacture of screws and other articles, the combination of a hollow or tubular rotary mandrel for holding and rotating the work, a rotatably-adjustable carrier provided with movable or adjustable mandrels or tool-holders, a saddle for supporting the said carrier, a boss $i$, forming the guide or support for the work and secured to the said saddle, and a lever pivoted to the said saddle and carrying a milling tool or cutter, substantially as set forth.

In testimony whereof I have hereunto signed my name in the presence of two subscribing witnesses.

PETER BARON.

Witnesses:
A. J. WALLIS TAYLOR,
A. H. SLEATH.